United States Patent Office 3,096,344
Patented July 2, 1963

3,096,344
PERFLUOROALKYLOXETANES
Leslie C. Case, Lafayette, Ind., assignor to Research Corporation, New York, N.Y., a corporation of New York
No Drawing. Filed May 9, 1961, Ser. No. 108,720
3 Claims. (Cl. 260—333)

This invention relates to novel polyfluoroalkyloxetanes.

It has been found that oxetanes having at least one polyfluorinated alkyl group attached to a ring carbon atom may be converted by polymerization or copolymerization to polymeric substances which can be converted by reaction with curing or cross-linking reactants to elastomeric products of high heat stability useful as temperature resistant elastomers and as flexible temperature resistant films and coatings. The monomeric oxetanes of the invention are also useful for producing a wide variety of compounds containing polyfluoroalkyl groups by reacting the oxetanes with compounds containing active hydrogens, such as alcohols, amines and the like.

Of particular usefulness are oxetanes containing at least one polyfluoroalkyl group containing from two to eleven carbon atoms attached to the 3-carbon atom of the oxetane ring.

A method of general applicability for producing oxetanes of the invention having polyfluoroalkyl groups containing from two to ten carbon atoms attached to the 3-carbon atom of the oxetane ring comprises acylating malonic or alkylmalonic esters with polyfluoroalkanoyl halides to produce the corresponding polyfluoroalkanoyl-malonic esters, reacting the malonic esters thus obtained with sulfur tetrafluoride to substitute two fluorines for the carbonyl oxygen of the polyfluoroalkanoyl group and reducing the polyfluoroalkylmalonic ester thus obtained to the corresponding 2-polyfluoroalkyl-1,3-propanediol with LiAlH$_4$. The propanediol is then converted to the corresponding 3-polyfluoroalkyloxetane by the method of U.S. patent application Serial No. 835,835, now Patent 3,006,926, for Production of Cyclic Ethers, filed August 25, 1959, by Leslie C. Case and Laurence F. Schmoyer.

When starting with unsubstituted malonic esters in the method outlined above either one or both of the hydrogens in the 2-position of the ester may be replaced by polyfluoroalkanoyl groups.

Among the polyfluoroalkanoic acids which may be used in the method are:

CF$_3$.COOH.
CF$_3$.(CF$_2$)$_n$.COOH, where in $n$ is 1 to 8.

Other polyfluoroalkanoic acids are listed in Table 20, pages 210–215 of Aliphatic Fluorine Compounds, by Lovelace, Postelnek and Rausch (New York, 1958).

Oxetanes substituted in the 2-position may be made from the aldehydes of the polyfluoroalkanoic acids discussed above. The aldehydes may be obtained by reduction of the acids or their esters with LiAlH$_4$. The polyfluoroalkanal is reacted with a haloacetic acid ester and zinc in the Reformatsky reaction to give the corresponding 3-polyfluoroalkyl-3-hydroxypropionic ester, which is reduced to the 1,3-diol with LiAlH$_4$. The diol is condensed to the 2-polyfluoroalkyl oxetane by the method of the Case and Schmoyer application referred to above.

A method particularly suitable for the production of the 3,3-di(trifluoromethyl)oxetane comprises condensing diethyl malonate with formaldehyde under alkaline conditions to give the diethyl ester of di(hydroxymethyl) malonic acid, esterifying the hydroxyl groups with a blocking acid such as benzoic acid, converting the —COOC$_2$H$_5$ groups of the malonic ester to —CF$_3$ groups by direct action of SF$_4$ or by preferential hydrolysis to the malonic acid followed by fluorination with SF$_4$. The blocking acid groups are then hydrolized off, giving the 2,2-di(trifluoromethyl)-1,3 propanediol which is converted to 3,3-di(trifluoromethyl)oxetane by the method of the Case and Schmoyer application.

The following are illustrative specific examples of methods of making the new polyfluoroalkyloxetanes of the invention.

*3-Ethyl-3-Nonafluorobutyloxetane*

10 gm. of sodium are dissolved in 300 ml. of absolute ethanol in a 500 ml. flask. 81.2 gm. of diethyl ethylmalonate are added and the solution is evaporated under vacuum until a dry solid salt is obtained. The salt is dissolved in the flask in 200 ml. of dry diethyl carbonate and 100 gm. of heptafluorobutyryl chloride are dropped slowly into the solution at room temperature. The reaction mixture is then refluxed with stirring for about 40 hours and cooled. The liquid is decanted from the solid precipitate and the latter is dissolved in water, extracted with ether and the extract added to the decanted liquid. After removal of the volatile solvent under vacuum, the residual diethyl ethyl-heptafluorobutryl-malonate is vacuum distilled. B.P. 106°–114° C. (12 mm. Hg), $n_D^{25}$: 1.3818, d: 1.2588.

75 gm. of the ethyl-heptafluorobutyrylmalonic ester in 200 ml. of benzene are placed in a 500 ml. stainless steel autoclave and 29 gm. of SF$_4$ are charged into the autoclave. The mixture is heated at 150° C. for 8 hours with agitation. The reaction mixture is treated with NaF in ether solution to react with any HF and the solution is filtered and vacuum distilled. The diethyl ethyl-nonafluorobutylmalonate thus obtained boils at 105°–113.5° C. (11 mm. Hg), $n_D^{25}$: 1.3801, d: 1.2937.

14 gm. of LiAlH$_4$ are dissolved in 250 ml. of dry ether and 50 gm. of the ethyl-nonafluorobutylmalonic ester dissolved in twice its volume of ether is slowly dropped into the LiAlH$_4$ solution. The mixture is stirred over night and after destroying excess LiAlH$_4$ with water-saturated ether, cold sulfuric acid (40 ml. of 96% H$_2$SO$_4$ and 200 gm. of ice) is slowly added. The acid layer is separated from the organic layer and extracted with 50 ml. of ether and 3 portions of benzene totaling 250 ml. The combined extracts and organic layer are vacuum distilled. The 2-ethyl-2-nonafluorobutyl-1,3-propanediol boils at 146° C.–150° C. (11 mm. Hg), $n_D^{25}$: 1.4029.

1.5 gm. of the propanediol thus obtained are dissolved in 2.5 ml. of 96% H$_2$SO$_4$ and dropped slowly into a boiling solution of 120 gm. of NaOH in 53.5 ml. of water in a flask equipped with stirrer, dropping funnel, condenser and ice-cooled receiver. The distillate comes over at a vapor temperature between 70°–100° C. The 2-ethyl-2-nonafluorobutyloxetane is extracted from the distillate with ether and the extract is fractionated at atmospheric pressure. B.P. 140°–140.5° C., $n_D^{25}$: 1.3789.

*2-Heptafluoropropyloxetane*

In a 1-liter flask equipped with a reflux condenser and a magnetic stirrer are placed 100 ml. of dry ether, 100 ml. of dry benzene, 64 gm. of heptafluorobutyraldehyde, 53.4 gm. of ethylbromoacetate and 22.9 gm. of zinc dust. After 2 hours of refluxing 4 gm. of dust are added and refluxing is continued for 7 more hours. The reaction mixture is then poured into a cold acid solution made by pouring 40 ml. of 96% sulfuric acid over 400 gm. of ice. The organic layer is separated from the aqueous layer, the latter is extracted with three 100 ml. portions of ether and the ether extracts are added to the organic layer. The mixture is washed with 150 ml. of saturated NaHCO$_3$ solution and 150 ml. of water and dried over anhydrous calcium sulfate. After evaporating the bulk of the ether and benzene at atmospheric pressure, the ethyl 6,6,6,5,5,4,4-heptafluoro-3-hydroxyhexanoate is distilled under vacuum. B.P. 80–95° C. (9 mm. Hg), $n_D^{25}$: 1.3539.

52.7 gm. of the ester thus obtained is dissolved in an equal volume of dry ether and dropped slowly into a solution of 14 gm. of LiAlH₄ in 250 ml. of dry ether. The mixture is stirred over night, and excess LiAlH₄ is then destroyed with 400 ml. of water-saturated ether. A cold acid solution from 50 ml. of 96% H₂SO₄ and 250 gm. of ice is added cautiously to the reaction mixture. The ether layer is separated, the aqueous layer is extracted with 100 ml. of ether and three portions of benzene totaling 250 ml., and the extracts are added to the ether layer. After evaporating off the ether at atmospheric pressure, the residual benzene solution is cooled and white solid crystals of 6,6,6,5,5,4,4-heptafluoro-1,3-hexanediol which separate are filtered off. M.P. 91°–92° C.

41.0 gm. of the diol thus obtained are dissolved in 9.3 ml. of 96% H₂SO₄ and dropped slowly into a boiling solution of 240 gm. of NaOH in 107 ml. of water in a flask equipped with stirrer, condenser and dropping funnel. The 2-heptafluoropropyloxetane formed distills off with water at a vapor temperature of between 70° C. and 90° C. The distillate is collected in an ice-cooled flask. The organic layer is separated and dried over anhydrous calcium sulfate. B.P. 105°–107° C., $n_D^{25}$: 1.3146.

The polyfluorooxetanes of the invention can be polymerized in solvents, such as methylene chloride and liquid sulfur dioxide or without solvents, by means of condensation catalysts, such as hydrogen fluoride, BF₃ and BF₃ molecular complexes, for example, with acetonitrile, acetic acid and ether.

The polymerized polyfluorooxetanes can be cured to heat resistant elastomeric products by reacting with polyisocyanates such as tolylene diisocyanate and thereafter with compounds containing a plurality of reactive hydrogens such as 4,4'-diaminodiphenylmethane, or by reacting with a free radical generator and a free radical acceptor using the reagents and procedures described in U.S. Patent 2,906,738 to Earl J. Goldberg.

Copolymerizates of the polyfluorooxetanes with oxetane, alkyloxetanes, and tetrahydrofurane can also be cross-linked by the foregoing methods.

Copolymerization of the polyfluorooxetanes with chloroalkylethylene oxides, such as chloromethylethylene oxides provide chlorine containing copolymers which can be cross-linked with diamines or by the action of zinc oxide.

I claim:
1. An oxetane selected from the group consisting of oxetanes of the formula

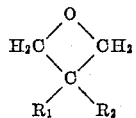

wherein $R_1$ is a perfluoro lower alkyl group of 1 to 9 carbon atoms and $R_2$ is selected from the group consisting of perfluoro lower alkyl groups of 1 to 9 carbon atoms, lower alkyl of 1 to 2 carbon atoms and hydrogen, and oxetanes of the formula

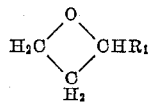

wherein $R_1$ is a perfluoro lower alkyl group of 1 to 9 carbon atoms.

2. An oxetane of the formula

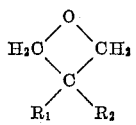

wherein $R_1$ is a perfluoro lower alkyl group of 1 to 9 carbon atoms and $R_2$ is lower alkyl of 1 to 2 carbon atoms.

3. An oxetane of the formula

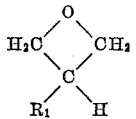

wherein $R_1$ is a perfluoro lower alkyl group of 1 to 9 carbon atoms.

References Cited in the file of this patent
UNITED STATES PATENTS

| 2,995,571 | Harris | Aug. 8, 1961 |
| 2,995,572 | Harris | Aug. 8, 1961 |

OTHER REFERENCES

Y. Etienne, Chemical Abstracts, vol. 51, page 15,992 (1957).